United States Patent [19]
Jaeger et al.

[11] 3,981,705
[45] Sept. 21, 1976

[54] METHOD OF MAKING OPTICAL WAVEGUIDES FROM GLASS FIBERS

[75] Inventors: Raymond Edward Jaeger, Basking Ridge; Thomas John Miller, Green Brook, both of N.J.

[73] Assignee: Bell Telephone Laboratories, Incorporated, Murray Hill, N.J.

[22] Filed: May 5, 1975

[21] Appl. No.: 574,437

[52] U.S. Cl. .......................... 65/2; 65/13; 219/121 L; 219/121 LM; 240/41.36; 425/174.4; 425/392
[51] Int. Cl.² .................................. C03B 37/02
[58] Field of Search ......... 65/2, 13; 425/174, 174.4, 425/392, DIG. 19; 219/121 L, 121 LM; 240/41.36

[56] References Cited
UNITED STATES PATENTS

| | | | |
|---|---|---|---|
| 1,691,307 | 11/1928 | Schimpff | 240/41.36 |
| 3,622,739 | 11/1971 | Steffen | 219/121 L |
| 3,652,248 | 3/1972 | Loxley et al. | 65/13 X |
| 3,662,165 | 5/1972 | Osteen et al. | 240/41.36 X |
| 3,754,132 | 8/1973 | Mamrud et al. | 240/41.36 X |
| 3,865,564 | 2/1975 | Jaeger et al. | 65/13 X |

*Primary Examiner*—Robert L. Lindsay, Jr.
*Attorney, Agent, or Firm*—Walter Grahn Nilsen, Sr.; W. G. Nilsen

[57] ABSTRACT

A procedure is described for drawing glass fibers which are particularly suitable for use in optical waveguides. A laser is used as a souce of heat and an optical system is provided for focusing an annular beam around a glass preform from which the glass fiber is drawn. Particular attention is devoted to the optical focusing system to provide highly uniform distribution of heat and insure very precise short and long term fiber diameter control and precise control of the optical properties (freedom from scattering centers, profile of optical properties across the diameter) of the fiber. Precise diameter control of glass fibers for optical waveguides is highly desirable because it minimizes optical losses and facilitates low-loss splicing of individual glass fibers.

11 Claims, 5 Drawing Figures

METHOD OF MAKING OPTICAL WAVEGUIDES FROM GLASS FIBERS

BACKGROUND OF THE INVENTION

1. Field of the Invention

The invention relates to a process for drawing glass fibers for optical communication systems. More particularly, it is concerned with methods for controlling the optical properties and diameter of the optical fiber.

2. Description of the Prior Art

The fabrication of glass fibers with precise optical properties and uniform diameter has become important in recent years because of their potential use in optical communication systems. A variety of procedures have been devised for obtaining glass fibers with these characteristics, including the use of lasers as sources of heat. See, for example, U.S. Pat. No. 3,865,584, issued Feb. 11, 1975 to R. E. Jaeger et al. A particular advantage of using a laser as a source of heat is the ability to direct and focus the laser beam over a limited area using ordinary geometric optics.

Processes for fabricating glass fibers using laser radiation may be divided into two categories. In one category, the preform (glass structure from which the fiber is drawn) is rotated to achieve more cylindrically symmetric temperature distribution. In the second category, optical processing of the laser beam is used to obtain a more cylindrically symmetric temperature distribution. This may be done, for example, by rotation of the laser beam around the preform. Another method depends on the use of a particular laser mode (say a donut mode) for heating the preform. By proper use of lenses and other optical devices, the laser radiation can be uniformly distributed about the preform. The invention is concerned with the second category of processes.

Radial rotation of the laser beam may be achieved by movement of the laser beam and translation of this movement into radial rotation by appropriate use of geometrical optical devices. In the above-described reference, a specific system is described which achieves radial rotation of the laser beam about the glass preform. A description of this optical system may be helpful in understanding the prior art.

The source of heat can be an infrared laser with radiation frequency in the spectral range where the glass is strongly absorbent. Typical is the use of the $CO_2$ laser with output at 10.6 $\mu$m. The output of the laser is directed through a rotating lens and onto a planar reflector.

Although the planar reflector may be mounted in a variety of ways, it is preferred for symmetry reasons to have the planar reflector mounted to 40° from both the laser beam and the axis formed from the pulled fiber and glass preform. The lens is rotated eccentrically at high speeds about the axis of the laser beam. This produces a more or less circular motion to the laser beam (when viewed in a plane orthogonal to the laser beam). The rotating laser beam is reflected off the 45° mirror to a conical reflector which directs the laser energy onto the glass preform. The glass preform is fed through the back of the conical reflector and the glass fiber is pulled toward and through a hole in the 45° mirror. By rapid rotation of the lens (typically in excess of 1500 rmp) which results in radial rotation of the laser beam around the glass preform, the heating of the preform is made cylindrically more uniform.

Another method of obtaining cylindrically uniform distribution of laser heat on the preform without beam rotation involves use of a donut mode in the laser and the use of lenses and a conical reflector to direct the laser radiation onto the preform.

Although excellent diameter control can be achieved using a rotating laser beam and the optical system described above, improvements in the short term control of diameter, the long term control of diameter and process stability are highly desirable. Improved diameter control ultimately leads to lower losses and less scatter. Because of the shape of the conical reflector, the laser radiation reaching the glass preform is focused in the form of a line along the axis of the preform and drawn fiber. This concentrates equal radiation on both the massive glass preform and the partially drawn glass fiber causing much higher concentration of radiation on the drawn fiber. Improved diameter control can be achieved by a more suitable distribution of laser radiation on the glass preform and glass fiber being drawn. Also, better matching of the laser radiation to the glass preform and drawn glass fiber should result in a more stable fiber drawing process which is especially advantageous under conditions of glass fiber manufacture.

SUMMARY OF THE INVENTION

The invention is a process for drawing glass fibers using a laser as a source of heat. The process permits efficient heating of the glass preform and without excessive concentration of radiation on the fiber being drawn. This is done by removing the focus of the laser radiation from the center of the preform. The focus may be extended beyond the axis of the preform or made incident in front of the axis of symmetry. Also, unfocused radiation may be used as, for example, reflection off a conical reflector with planar facets. The optics involved in directing the laser radiation to the glass preform are arranged in such a way so that a fairly large percentage of laser radiation is intercepted by the glass preform. Although this can be accomplished in a variety of ways, most convenient is the use of a conical reflector with a number of individual facets. These facets may be planar or curved when viewed in the plane perpendicular to the axis of the conical reflector. In the planes which include the axis, the facets are usually planar for ease of manufacture, but may be curved to concentrate or diffuse the radiation at the axis of the reflector. The maximum and minimum number of facets and the curvature of the facets are determined by the diameter of the glass preform, the distance between laser reflection on the conical reflector and the glass preform, etc. It is preferred that at least 20 percent of the laser radiation reflected from the conical reflector be incident on the glass preform so as to insure efficient use of laser power. Also, to insure that the laser radiation does not become too concentrated, it is preferred that the laser beam incident on the glass preform not be overly concentrated in too small a volume. Thus, it is preferred that the laser radiation be sufficiently diffused so that it does not all enter a cylindrical zone which 1) lies on the symmetry axis of the glass preform and drawn fiber, and 2) has a diameter of one-third of the glass preform. Preferred minimum and maximum numbers of facets may be calculated from these conditions and the geometry of the optical drawing apparatus. Because this procedure results in better matching of laser radiation to the glass preform and fiber, the drawing procedure is more stable, and results in a more uniform glass fiber and more constant diameter control. Fibers drawn using the inventive procedure are especially well suited for use as optical waveguides.

DETAILED DESCRIPTION

Figure 1:
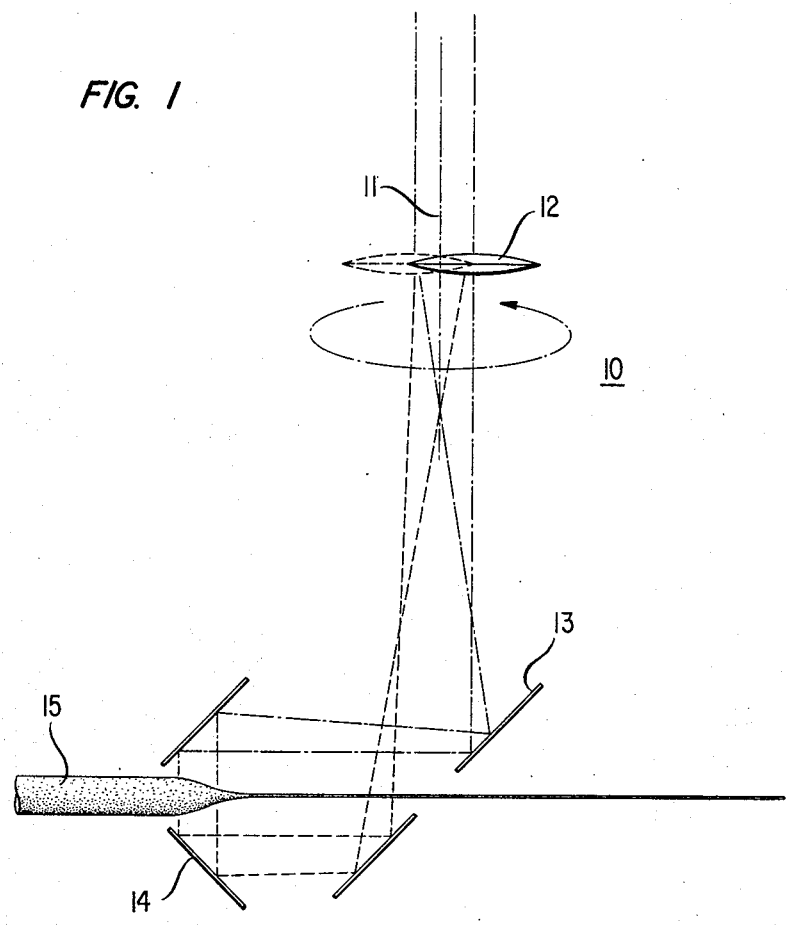
FIG. 1 shows a diagram of a particular arrangement of a laser energized fiber drawing apparatus.

The invention involves a process for fabricating glass fibers specially suited for transmission lines in optical communication systems. The process uses as a heat source a laser with radiation output in the spectral range where the glass used to fabricate the fiber is absorbent. In broad terms, the invention is concerned with the nature of the focusing of the laser radiation onto the glass preform and fiber being drawn. An object of the invention is to distribute the laser radiation onto the glass preform and drawn fiber in such a way so as to make approximately uniform the temperature distribution in the zone where the glass is being necked down to fiber dimensions. At the same time, the laser rays should be directed in such a way that a significant percentage of these rays are incident upon the glass preform. In preferred embodiments the laser radiation is arranged in such a way so as to provide a reasonable match between this radiation and the fiber being drawn. For efficiency, it is preferred that at least 20 percent of the laser radiation directed toward the glass preform be incident on the glass preform. Higher percentages such as 50 or even 80 percent are desirable because of more efficient use of available laser power. Particularly suitable is a laser beam with width equal to the diameter of the glass preform (or slightly smaller because of reflections at glancing angles). To prevent too much concentration of radiation on the glass preform, it is preferred that the focus of the laser beam reflected from the various facets of the conical reflector not be concentrated in too small a volume. This volume is roughly in the form of a cylinder, directed along the axis of the preform and with a radius which is one-third of that of the preform. Also, this radius should not be less than about ½ – 1 mm. Specific ways of accomplishing this end are described in more detail below.

The process is applicable to a variety of glasses and to both clad and unclad fibers. Fused silica glass appears to be particularly attractive because of low loss at frequencies contemplated for optical communication systems. The glasses may contain a variety of dopants including inorganic oxides, borosilicate compositions, soda-lime-silica compositions, etc. A variety of lasers may be used as the source of heat provided the radiation output is strongly absorbed by the glass. Presently the $CO_2$ laser with output at 10.6 microns is preferred because of its ready availability and high power output. Lasers are particularly attractive in fabricating glass fibers because the short neck-down region produced on the glass preform offers the possibility of a rapid response to a feedback system for controlling fiber diameter variation. Other preferred features of the invention should also be noted. For example, it is preferred that the laser radiation be more or less uniformly incident on the glass preform. This accomplishes two important ends; first, it makes for a more uniform distribution of heat throughout the glass preform; and second, it reduces the sensitivity of the glass drawing process to ultracritical positioning of the glass preform in the beam. This latter consideration is of considerable importance where glass fibers are made under commercial manufacturing conditions. As will be shown below, such things as vibrations from motors and other disturbances have profound effects on diameter variations of the fiber. The elimination of such diameter variations is of prime concern in devising a process for fiber fabrication under commercial manufacturing conditions.

The essential features of the process outlined above may be accomplished in a variety of ways. The process may be practiced with a rotating laser beam as described above, or with a laser beam radiating in a donut mode where beam rotation may not be necessary, or even in conjunction with a laser beam which has been optically processed so as to redistribute the energy into an annular geometry. FIG. 1 shows one particular system 10 for using laser radiation to draw glass fibers. This particular system has been described in detail in the reference given in the prior art section. The laser beam 11 is directed onto a lens 12 which is rotated approximately in a circular path. This has the effect of rotating the laser beam around in an approximate annular path. The laser beam is made incident on a 45° mirror 13 with a hole in the middle through which the fiber is drawn. The laser beam is reflected from the 45° mirror onto a conical reflector 14 which directs the laser beam onto the glass preform 15. Since the laser beam is rotated circularly, the effect of the conical reflector is to make the laser beam rotate annularly around the glass preform.

Figure 2:
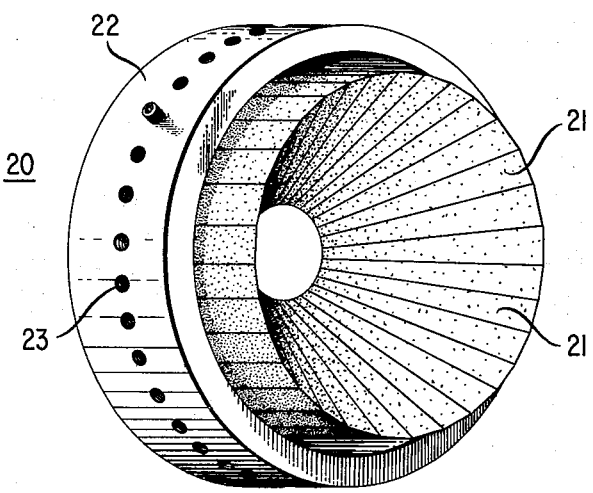
FIG. 2 is a perspective view of a conical reflector showing a number of facets.

A particular method of insuring that the focus of the laser beam does not coincide with the axis of the glass fiber is through a particular design of the conical reflector. This design should depart from an ordinary conical reflector (a conical reflector with a circular cross section perpendicular to the symmetry axis) since such a reflector has its focus on the symmetry axis. One particular design of reflector 20 is shown in FIG. 2. Here, instead of having the cross section (orthogonal to the axis) perfectly circular, the reflector is made up of facets 21 with radius of curvature longer or shorter than that of a perfectly circular conical reflector. For convenience, this type of reflector will be referred to as the faceted conical reflector. The facets are held in place by a holder and the position of each facet adjusted by individual set screws 23. The faceted conical reflector may be made by machining individual facets, by electroforming on a mandrel, etc. The effect of this structure, when properly designed, is to insure that the line focus of the laser radiation from any facet does not coincide with the symmetry axis of the conical reflector. This may be accomplished by insuring that the radii of curvature of the facets are either sufficiently long to lie beyond the symmetry axis or sufficiently short to be in front of the symmetry axis. Different facets may have different radii of curvature. The number of facets in the circular reflector may vary over large limits, but at least two are required. A lower limit of three is preferred for ease in completely enclosing the faceted conical reflector. Preferences for other lower limits are based on two considerations. First, for a small number of facets (e.g., three) and focus away from the symmetry axis, the cross section of the conical reflector perpendicular to its axis deviates considerably from a circle. For this reason the region in which laser radiation is incident on the glass preform varies along the symmetry axis as the laser beam rotates about the conical reflector. This effect is more pronounced the fewer the facets on the conical reflector. It causes variations in the diameter, circularity and optical properties of the drawn fiber. For this reason it is preferred that the minimum number of facets should be six. As the number of facets increases, this effect is reduced. The second consideration concerns the minimum amount of laser radiation striking the glass preform. The fewer the number of facets, the larger the area over which the laser radiation is reflected. If this area is considerably larger than the diameter of the glass preform, much of the radiation reflected by the conical reflector is not incident on the glass preform. This is undesirable largely from the point of view that it is wasteful of laser energy. The preferred minimum number of facets depends, in a rather complicated way, on the diameter of the glass preform and on the radii of curvature of the facets. For any given diameter and radius of curvature and given the geometry of the conical reflector, the amount of radiation incident on the glass preform can be calculated from conventional geometric optical considerations. It is preferred that at least 20 percent of the laser radiation incident on the conical reflector should be incident on the glass preform. Larger percentages, such as 50, 80 or even approximately 100 percent, are even more desirable because of efficient use of laser radiation.

Preferred minimum and maximum numbers of facets may be specified for 100 percent incidence of radiation on the glass preform. The number of facets in a faceted conical reflector is given approximately by $$N = \frac{2\pi R}{W}$$

where R is the radius of the faceted conical reflector at the point that the laser beam intercepts the reflector at the center of the facets and W is the width of the facet where the laser beam is incident on the facet. The approximation involves defining W as the straight-line width of the facet instead of the arc length between edges of the facet.

For planar facets with 100 percent radiation incident on the preform, the minimum number of facets ($N_{min}$) corresponds to where the facet width W equals the preform diameter (or twice the preform radius r). Then, $$N_{min} = \frac{\pi R}{r}$$

For curved facets with radius of curvature S, the above expression is multiplied by $(1 - R/S)$ for concave facets and $S > R$; $(R/S - 1)$ for concave facets and $S < R$ and $(R/S + 1)$ for convex facets.

The maximum number of facets is obtained by the requirement that the cylinder within which all the reflected rays pass be no less in radius than one-third the radius of the preform, but in no case less than ½ millimeter. This requires that for concave facets with $S > R$ or planar facets, $W > 1$ mm or $2\pi R > N_{max} > 3N_{min}$ where R is in millimeters. For concave facets with $S < R$ and for convex facets, $W > 0.2$ mm and $10\pi R > N_{max} > 3N_{min}$. Where the radius of the faceted conical reflector becomes very large, the number of facets might become as high as 10,000.

Energy distribution around the preform also should be considered in designing the optimum faceted conical reflector. In some designs, different areas of the preform receive reflected radiation from different numbers of facets. For planar facets, which are preferred because of ease of manufacture, any number of facets between Nmin and Nmax tends to give equal distribution of radiation around the circumference of the glass preform.

Figure 3:
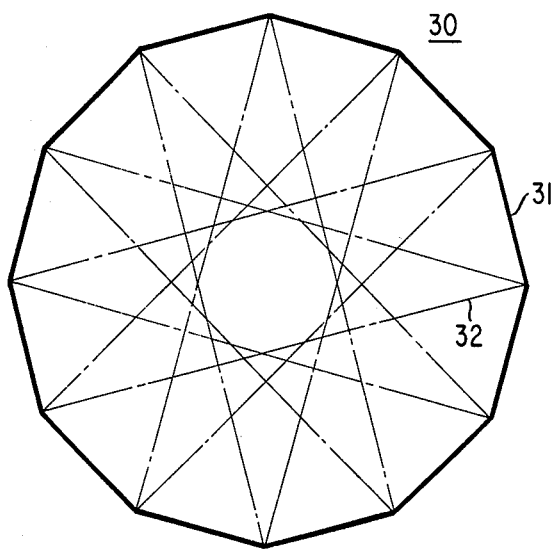
FIG. 3 is a sectional view perpendicular to the axis of a conical reflector with planar facets, shown with a drawing of the light rays.
Figure 4:
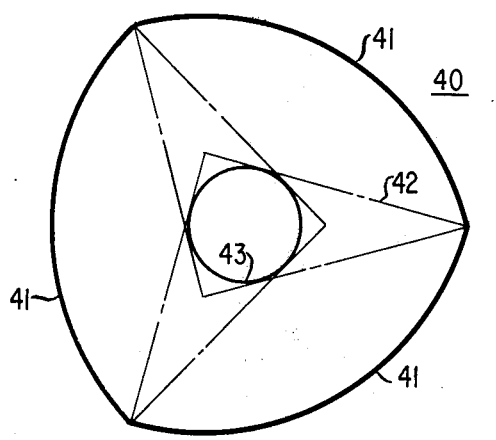
FIG. 4 is a sectional view of a conical reflector having curved facets.
Figure 5:
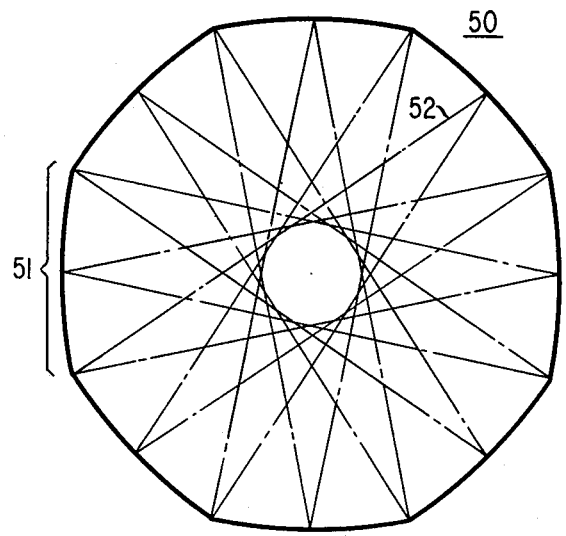
FIG. 5 is a sectional view of a conical reflector with curved facets, shown with a drawing of the light rays.

Drawings of typical conical reflectors are shown in FIGS. 3, 4 and 5. End views are shown together with ray diagrams of laser light reflected off the facets. In FIG. 3, a conical reflector 30 is shown with 12 planar facets 31 and the optical rays 32 for parallel incident rays. The glass preform enters the conical reflector through a hole in the center of the reflector. FIG. 4 shows a conical reflector 40 with three curved facets 41, optical ray diagram 42 and the glass preform 43. The curved facets tend to concentrate the laser radiation onto the glass preform. FIG. 5 shows another design of the conical reflector 50 with 8 curved facets 51 and optical ray diagram. Conical reflectors with curved facets can often be made from circular conical reflectors by removing material (taking saw cuts) between the individual facets. Individual fabrication of the facets and assembly in a suitable jig may also be used. One piece construction such as electroforming on a mandrel may also be used.

Although a large variety of geometries can be used in the design of the facets on the conical reflector, certain simple geometries are preferred principally because of ease of manufacture and minimization of the number of conical reflectors. Naturally, a negative radius of curvature (a convex rather than concave facet) may be used, but such facets are usually difficult to manufacture and usually require a larger number of facets to achieve desirable results. Facets with a positive radius of curvature (concave facets) are advantageous in certain applications because of the possibility of reducing the total number of facets. Planar facets are preferred for many applications because of ease of manufacture and ease in determining design considerations which will optimize distribution of laser radiation, efficiency and optical properties. Particularly preferred are planar facets which are equal in width to the diameter of the glass preform or up to a factor of four less than the diameter of the glass preform. This design insures maximum efficiency in the sense that a maximum amount of radiation is incident upon the glass preform and still insures that the laser radiation is reasonably evenly distributed over the circumference of the glass preform.

The invention may be illustrated by a particular example. Glass fibers were drawn with the laser apparatus described above in which a conical reflector with 12 planar facets were used. The diameter of the glass preform was 7 mm and the fiber diameter was in the range of 75–100 micrometers. The glass preform was fed at a rate of 11.4 mm per minute, and the glass fiber was drawn at a rate of 93 cm per second. The lens which was used to move the laser beam in a circular path was rotated at a speed of 3,000 rpm. The laser power required was in the range of 180–225 watts and the circular motion of the laser beam incident on the conical reflector had an inside diameter of 19 mm and an outside diameter of 32 mm. Under these conditions glass fibers having a 1 percent or less standard deviation in diameter were routinely produced, whereas previously the variations were of the order of two percent. Fibers produced in this manner had not only better short term diameter control, but also improved long term diameter control.

We claim:

1. A process for fabricating glass fiber in which the glass fiber is drawn from a glass preform which has been softened by heating with laser radiation in the frequency range where the glass is absorbent, comprising the steps of
   A. directing the laser radiation onto a conical reflector with a hole in the center so as to reflect the laser radiation toward the glass preform, said conical reflector having at least 3 facets the number of facets and radii of curvature of the facets on the reflector being arranged to effect a uniform temperature distribution in the zone where the glass is being necked down such that the focus of the laser beam does not concentrate at the center of the preform;
   B. feeding the glass preform through the hole in the center of the conical reflector; and
   C. pulling the glass fiber from the softened glass preform approximately along the axis of the glass preform.

2. The process of claim 1 in which the laser is a $CO_2$ laser.

3. The process of claim 1 in which at least 20 percent of the laser radiation reflected off the conical reflector is incident on the glass preform.

4. The process of claim 3 in which at least 50 percent of the laser radiation reflected from the conical reflector is incident on the glass preform.

5. The process of claim 4 in which approximately 100 percent of the laser radiation reflected from the conical reflector is incident on the glass preform.

6. The process of claim 5 in which a cylinder through which the laser radiation is reflected has a radius of at least one-half millimeter.

7. The process of claim 6 in which the radius of the cylinder is one-third of the radius of the glass preform.

8. The process of claim 1 in which the minimum number of facets in the conical reflector is 6.

9. The process of claim 1 in which the facets of the conical reflector are planar.

10. The process of claim 1 in which the width of the planar facet at the point of incidence of the laser beam is between ¼ and 1 times the diameter of the glass preform.

11. The process of claim 1 in which the laser beam is rotated around the conical reflector by means of a rotating lens.

* * * * *